(12) United States Patent
Relyea et al.

(10) Patent No.: US 9,088,822 B2
(45) Date of Patent: Jul. 21, 2015

(54) SYSTEMS AND METHODS OF MEDIA CLIP SHARING WITH SPONSOR CARRYOVER

(71) Applicant: Verizon Patent and Licensing Inc., Arlington, VA (US)

(72) Inventors: Donald H. Relyea, Dallas, TX (US); George M. Higa, Plano, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 0 days.

(21) Appl. No.: 13/925,381

(22) Filed: Jun. 24, 2013

(65) Prior Publication Data
US 2014/0380354 A1     Dec. 25, 2014

(51) Int. Cl.
*H04N 21/442*     (2011.01)
*G06Q 50/00*      (2012.01)
*H04N 21/234*     (2011.01)
*H04N 21/81*      (2011.01)

(52) U.S. Cl.
CPC ......... *H04N 21/44222* (2013.01); *G06Q 50/01* (2013.01); *H04N 21/23424* (2013.01); *H04N 21/812* (2013.01)

(58) Field of Classification Search
CPC .................................................. H04N 21/4422
USPC .......................................................... 725/32
See application file for complete search history.

(56) References Cited

U.S. PATENT DOCUMENTS

| 2011/0137722 | A1* | 6/2011 | Mathai et al. | 705/14.41 |
| 2013/0198642 | A1* | 8/2013 | Carney et al. | 715/738 |
| 2013/0305158 | A1* | 11/2013 | Vasquez et al. | 715/733 |
| 2014/0067702 | A1* | 3/2014 | Rathod | 705/319 |

* cited by examiner

*Primary Examiner* — Jefferey Harold
*Assistant Examiner* — Justin Sanders

(57) ABSTRACT

An exemplary method includes a computer-implemented media clip sharing system receiving, from an end-user of a media distribution service that distributes a media program, a request to share a clip of the media program to a social network and, in response to the request to share the clip of the media program to the social network, identifying a sponsor of the media program in the media distribution service and sharing the clip of the media program and data representative of the identified sponsor to the social network. Corresponding systems and methods are also described.

22 Claims, 14 Drawing Sheets

500

| Media Program ID | Sponsor ID |
|---|---|
| Media Program 1 | Sponsor 1 |
| Media Program 2 | Sponsor 2 |
| Media Program 3 | Sponsors 1, 3 |
| Media Program 4 | Sponsor 4 |
| Media Program 5 | Sponsors 1, 5 |
| Media Program 6 | Sponsors 6, 7 |
| ⋮ | ⋮ |
| Media Program N | Sponsors 1, 19, 20 |

Fig. 5

SYSTEMS AND METHODS OF MEDIA CLIP SHARING WITH SPONSOR CARRYOVER

BACKGROUND INFORMATION

Advances in technologies have made the practice of sharing clips of media programs among people convenient. For example, a consumer of a media program may conveniently share a clip of the media program to a social network by posting the clip and/or a link to the clip to a social networking site.

Unfortunately, a sponsor of the media program may not benefit, at least not directly, from the clip being shared to the social network by the consumer. For example, the shared clip and/or link to the clip may be devoid of any association with the sponsor of the media program. Accordingly, members of the social network may be entirely unaware of a sponsorship of the media program by the sponsor.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIGS. 4-5 illustrate exemplary data tables according to principles described herein.

DETAILED DESCRIPTION OF PREFERRED EMBODIMENTS

Examples of systems and methods of media clip sharing with sponsor carryover are described herein. The exemplary systems and methods described herein may include a media clip sharing system receiving, from an end-user of a media distribution service that distributes a media program, a request to share a clip of the media program to a social network (e.g., by way of a social media service) and, in response to the request to share the clip of the media program to the social network, identifying a sponsor of the media program in the media distribution service and sharing the clip of the media program and data representative of the identified sponsor to the social network.

In this or a similar manner, a sponsor of a media program in a media distribution service may be carried over to a social network along with a clip of the media program that is shared to the social network. The sponsor carryover may benefit the sponsor at least by extending the reach of the sponsor's advertising from the media distribution service to the social network. The sponsor carryover may further benefit a producer of the media program and/or an operator of the media distribution service, such as by increasing revenues paid by sponsors for extended exposure to the social network. Additionally or alternatively, the sponsor carryover may benefit the user who shared the media clip, such as by the user receiving financial benefit for sharing the clip (e.g., by being paid for each person in the social network who accesses the clip). These and/or other benefits may be provided by the exemplary systems and methods described herein.

Examples of systems and methods of media clip sharing with sponsor carryover, as well as exemplary views of media clip sharing graphical user interfaces ("GUIs") provided by the systems and methods will now be described in reference to the accompanying drawings.

Figure 1:
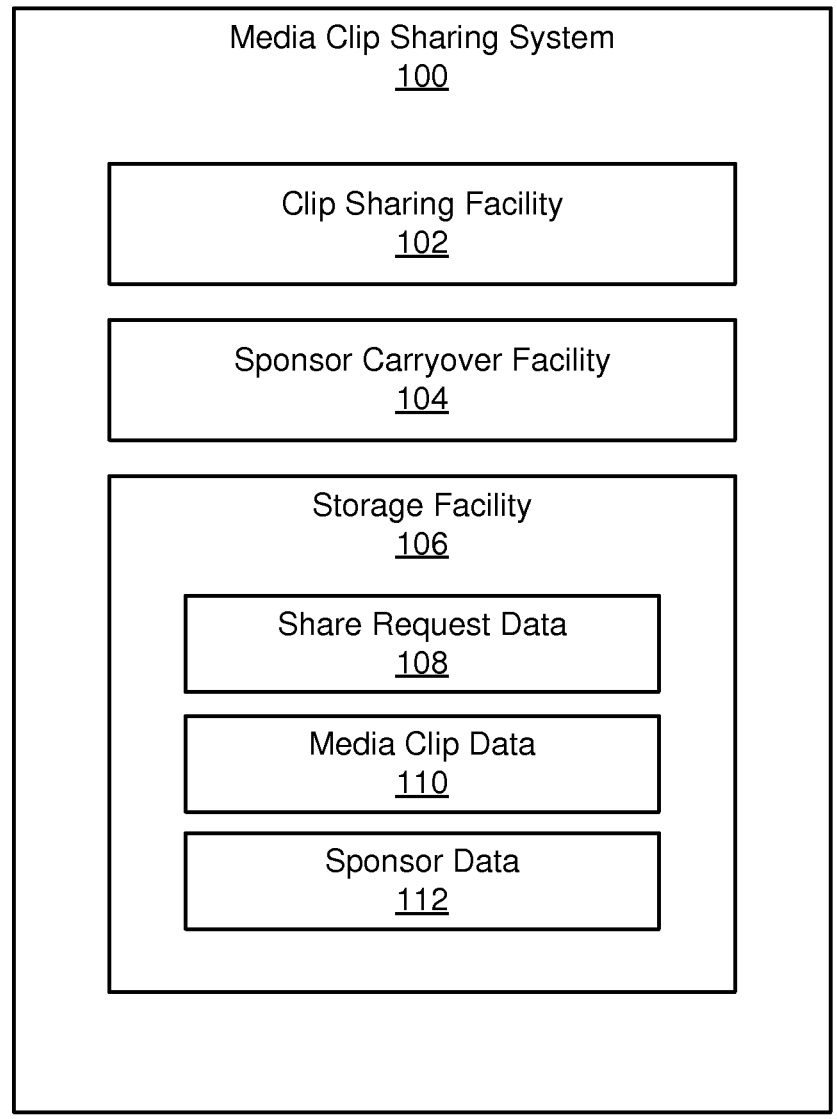
FIG. 1 illustrates an exemplary media clip sharing system according to principles described herein.

FIG. 1 illustrates an exemplary media clip sharing system 100 ("system 100"). As shown, system 100 may include, without limitation, a clip sharing facility 102, a sponsor carryover facility 104, and a storage facility 106 selectively and communicatively coupled to one another. It will be recognized that although facilities 102-106 are shown to be separate facilities in FIG. 1, any of facilities 102-106 may be combined into fewer facilities, such as into a single facility, or divided into more facilities as may serve a particular implementation. Facilities 102-106 of system 100 may include or be otherwise implemented by one or more computing devices. In such implementations, system 100 may be referred to as a computer-implemented system 100.

Storage facility 106 may be configured to store data generated and/or used by clip sharing facility 102 and/or sponsor carryover facility 104. For example, storage facility 106 may store share request data 108 representative of one or more requests to share one or more clips of one or more media programs to one or more social networks, media clip data 110 representative of one or more clips of one or more media programs (e.g., clips to be shared to one or more social networks), and sponsor data 112 representative of one or more sponsors of one or more media programs. Storage facility 106 may store additional or alternative data as may serve a particular implementation.

The data stored by storage facility 106 may be accessed by system 100 from any suitable source, including a source internal or external to system 100. Storage facility 106 may permanently or temporarily store data. In certain examples, system 100 may access certain data from a source external to system 100 and temporarily store the data in storage facility 106 for use by clip sharing facility 102 and/or sponsor carryover facility 104. In certain examples, data generated by clip sharing facility 102 and/or sponsor carryover facility 104 may be stored permanently or temporarily to storage facility 106.

Clip sharing facility 102 may be configured to perform any of the media clip sharing operations described herein. For example, clip sharing facility 102 may receive a request to share a clip of a media program to a social network. Clip sharing facility 102 may receive the request in any suitable way, such as from an end-user of a media distribution service that distributes the media program to the end-user, as described herein.

Clip sharing facility 102 may share the clip of the media program to the social network in response to the request. Clip sharing facility 102 may share the clip of the media program to the social network in any suitable way. For example, clip sharing facility 102 may transmit, to user computing devices associated with members of the social network or to a social media service configured to distribute social media to members of the social network, data representative of the clip of the media program and/or other data (e.g., hyperlink data, media index data, etc.) configured for use by members of the social network to access the clip of the media program.

Sponsor carryover facility 104 may be configured to perform any of the sponsor carryover operations described herein. For example, sponsor carryover facility 104 may identify a sponsor of the media program in response to the request to share the clip of the media program to the social network. Sponsor carryover facility 104 may identify the sponsor of the media program in any suitable way, including in any of the exemplary ways described herein.

Sponsor carryover facility 104 may share data representative of the identified sponsor to the social network in response to the request to share the clip of the media program to the social network. Sponsor carryover facility 104 may share the data representative of the sponsor to the social network in any suitable way. For example, sponsor carryover facility 104 may transmit, to user computing devices associated with members of the social network or to a social media service configured to distribute social media to members of the social network, the data representative of the sponsor. Sponsor carryover facility 104 may transmit the data representative of the sponsor together with or separate from the clip shared to the social network in a manner configured to facilitate the data representative of the sponsor being associated with the shared clip by a recipient of the shared clip and the data representative of the sponsor.

Figure 2:
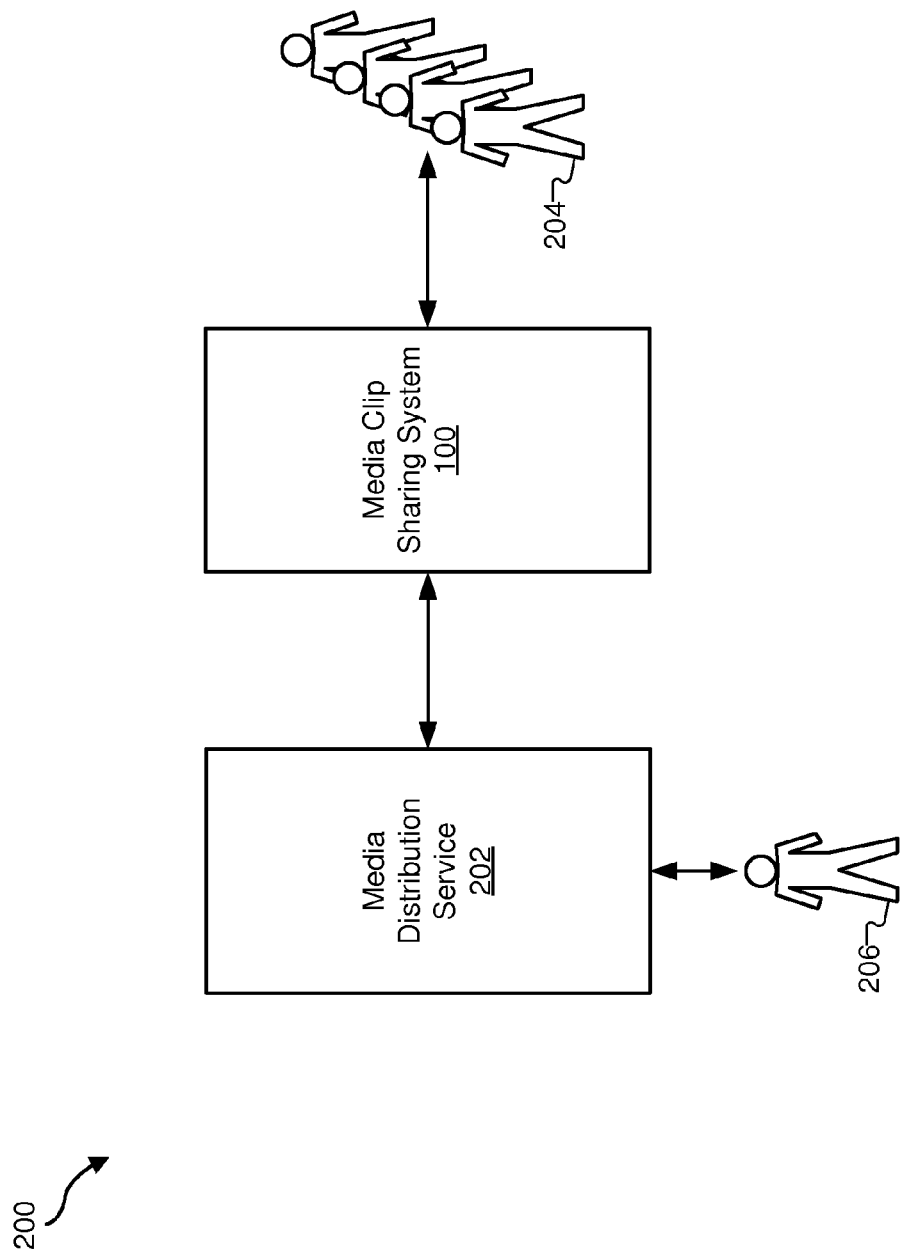
FIG. 2 illustrates an exemplary configuration in which the system of FIG. 1 is in communication with a media distribution service and a social network according to principles described herein.

FIG. 2 illustrates an exemplary configuration 200 in which system 100 is in communication with a media distribution service 202 and a social network 204. System 100 may be configured to communicate with media distribution service 202 and social network 204 in any suitable way and/or using any suitable communication technologies, including known communication technologies supportive of remote communications.

In certain embodiments, system 100 may be configured to communicate with media distribution service 202 and/or social network 204 via one or more communication networks (not shown), which may include, without limitation, one or more wireless networks (Wi-Fi networks), wireless communication networks, mobile telephone networks (e.g., cellular telephone networks), closed media networks, open media networks, closed communication networks, open communication networks, wide area networks (e.g., the Internet), local area networks, and any other networks capable of carrying data and/or communications signals between system 100 and media distribution service 202 and/or between system 100 and social network 204 (e.g., between system 100 and computing devices associated with social network 204).

Communications between system 100 and media distribution service 202 and/or social network 204 may be transported using any one of the above-listed networks, or any combination or sub-combination of the above-listed networks. Alternatively, system 100 may communicate with media distribution service 202 and/or social network 204 in another way, such as by direct connections between system 100 and media distribution service 202 and/or social network 204.

Social network 204 may include a group of one or more members, which may include entities such as individuals and/or organizations. Social network 204 may represent relationships and flows between the members in the group. In certain examples, social network 204 may include a group of one or more members who have a defined relationship with an end-user of media distribution service 202 who requests to share a clip of a media program. For instance, social network 204 may include a group of members who have a relationship with the end-user of the media distribution service 202 through a social media service (e.g., the end-user of the media distribution service 202 and the members of the group may all be end-users of the social media service and/or may have defined relationships one with another within the social media service). As an example, the end-user of the media distribution service 202 and the members of the group may be "friends," "contacts," or have another defined relationship within a social media service such as a social networking service and/or any other social media service, examples of which are described herein.

Media distribution service 202 may include any service configured to facilitate consumption of media programs by one or more end-users of media distribution service 202. For example, media distribution service 202 may be configured to distribute media programs to one or more end-users of media distribution service 202 (e.g., one or more subscribers to media distribution service 202) for consumption (e.g., viewing, recording, etc.) by the end-users. Media distribution service 202 may be associated with (e.g., operated by) a provider of media distribution service 202 (a "media distribution service provider"). Through media distribution service 202, an end-user 206 of media distribution service 202 may discover, access, and/or consume media programs distributed by way of media distribution service 202.

Media distribution service 202 may include and/or be provided by an appropriately configured media distribution service system, which may include any combination of computing devices and/or other equipment configured to distribute media programs to end-users of media distribution service 202. Media distribution service 202 may include any type of media distribution service configured to distribute any format of media programs by way of any suitable media distribution medium or channel. In certain examples, for instance, media distribution service 202 may include a television programming distribution service configured to distribute television programming (e.g., in accordance with a linear television programming schedule), an on-demand media distribution service configured to distribute media programs on-demand, a physical media distribution service configured to distribute physical copies of media programs (e.g., a media disc rental and/or purchase service), a digital media distribution service configured to distribute digital copies of media programs (e.g., a digital download and/or streaming service), and/or any other type of service that distributes media programs to end-users of media distribution service 202.

As used herein, the term "media program" may refer to any television program, on-demand media program, pay-per-view media program, broadcast media program (e.g., broadcast television program), multicast media program (e.g., multicast television program), narrowcast media program (e.g., narrowcast video-on-demand program), IPTV media program, advertisement, video, movie, audio program, radio program, or any other media program that a user may access by way of media distribution service 202. Such media programs that are made available for user consumption by media distribution service 202 may be accessed and/or played back by an appropriately configured user device (e.g., a media player device) for presentation to an end-user of media distribution service 202.

A media program distributed by media distribution service 202 may have one or more sponsors within media distribution service 202. As used herein, the term "sponsor" may refer to any entity (e.g., a person, a company, a government, etc.) that sponsors a media program within media distribution service 202 (e.g., a sponsor that sponsors the distribution of the media program within media distribution service 202). The term "sponsor" may additionally or alternatively refer to any sponsorship of a media program within media distribution service 202. A sponsor may sponsor a media program within media distribution service 202 in any suitable way, such as by paying at least a portion of the cost to distribute the media program, paying for a sponsorship of the media program, paying for distribution of an advertisement in association with the media program, and/or otherwise contributing specifically or generally toward the distribution of the media program by media distribution service 202 and/or a sponsorship of the media program within media distribution service 202 in any other suitable way.

Conventionally, sponsorship of a media program within media distribution service 202 is confined within media distribution service 202. Accordingly, a sponsor sponsoring a media program within media distribution service 202 has conventionally expected the sponsorship to be limited to media distribution service 202. For example, a sponsor may pay for distribution of an advertisement in a commercial break of a television program that is distributed by media distribution service 202 in accordance with a linear television programming schedule. Media distribution service 202 then distributes the advertisement for presentation within the commercial break of the television program.

An end-user of media distribution service 202 may want to share a clip of a media program distributed by media distribution service 202. For example, end-user 206 may want to share a clip of a media program to social network 204. Media distribution service 202 and/or system 100 may provide one or more clip sharing tools for use by end-user 206 to initiate sharing of a clip of a media program to social network 204. In certain examples, the clip sharing tools may include any tools configured to facilitate definition of the clip of the media program by end-user 206. Accordingly, end-user 206 may utilize such tools to define a clip of a media program that end-user 206 wants to share to social network 204.

As used herein, the term "clip" of a media program may refer to any portion of the media program literally or figuratively clipped from the media program. For example, a clip of a media program such as a television program may include a defined segment or combination of segments of the television program.

Additionally or alternatively, the clip sharing tools may be configured for use by end-user 206 to define a request to share a clip of a media program to social network 204. Accordingly, end-user 206 may utilize such tools to define a request to share a clip of a media program to social network 204. The request may include any information that may be used by system 100 to process the request as described herein. In certain examples, for instance, the request may include data representative of the clip, data representative of the media program, data representative of one or more sponsors of the media program, data representative of social network 204, data representative of a social media service, or any combination or sub-combination of such data.

System 100 may receive data representative of a request to share a clip of a media program to social network 204, which request may be defined by end-user 206 as described above. System 100 may receive the request in any suitable way, such as by receiving one or more communications indicative of the request from media distribution service 202 or by detecting one or more operations performed by clip sharing facility 102 in relation to the definition of the request by end-user 206.

System 100 may be configured to perform one or more operations in response to receiving the request to share the clip of the media program to social network 204. For example, clip sharing facility 102 may be configured to perform, in response to the share request, one or more clip sharing operations to share the clip of the media program to social network 204.

The clip sharing operations may include clip sharing facility 102 identifying the clip based on the share request. For example, clip sharing facility 102 may use data (e.g., actual media clip program data and/or media program index data) included in the request to identify the clip of the media program that is to be shared.

The clip sharing operations may include clip sharing facility 102 sharing the clip to social network 204. The sharing may be performed in any suitable way. As an example, clip sharing facility 102 may transmit data carrying the actual clip to computing devices associated with social network 204. As another example, clip sharing facility 102 may transmit data indicative of the clip to computing devices associated with social network 204 for use by the computing devices to access the actual clip (e.g., from media distribution service 202). For instance, clip sharing facility 102 may transmit hyperlink data for use by the computing devices to link to and access the clip from media distribution service 202.

The above-described examples of sharing the clip to social network 204 are illustrative only. Clip sharing facility 102 may share the clip to social network 204 in any other way configured to facilitate members of social network 204 accessing and consuming the clip.

In conjunction with the sharing of the clip to social network 204, sponsor carryover facility 104 may be configured to perform, in response to the share request, one or more sponsor carryover operations to carryover a sponsor of the media program from media distribution service 202 to social network 204. As used herein, a "carryover" of a sponsor of a media program from media distribution service 202 to social network 204 may include sponsor carryover facility 104 identifying a sponsor of the media program and sharing data representative of the identified sponsor of the media program to social network 204 in response to a request to share a clip of the media program to social network 204. Examples of how the sponsor may be carried over from media distribution service 202 to social network 204 will now be described.

As mentioned, sponsor carryover facility 104 may be configured to identify a sponsor of a media program in media distribution service 202 in response to a request to share a clip of the media program to social network 204. In certain examples, the identifying of the sponsor may include sponsor carryover facility 104 identifying a commercial break in the media program and a sponsor of advertising content associated with the commercial break.

Figure 3:
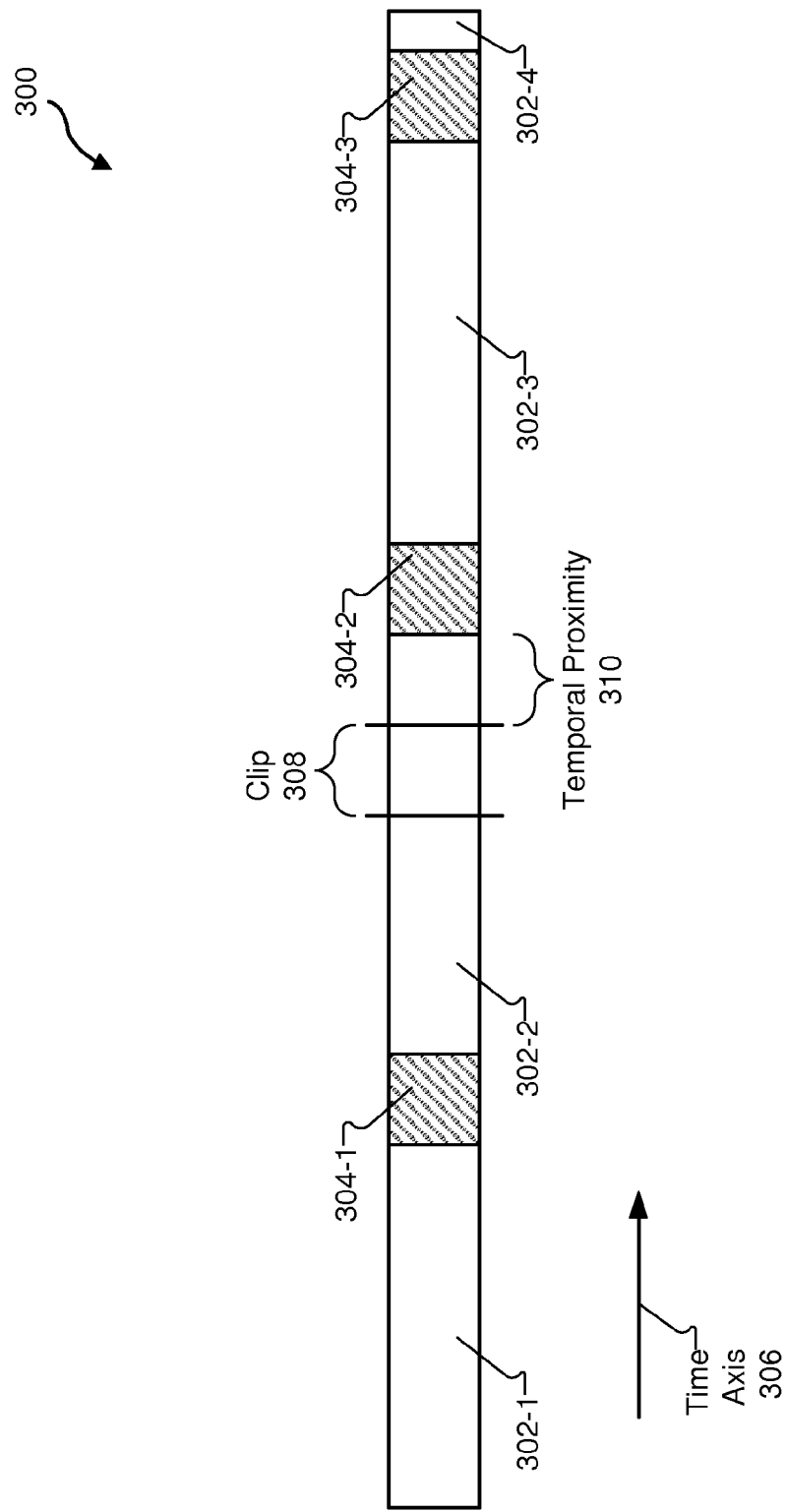
FIG. 3 illustrates exemplary elements of a media stream that carries a media program according to principles described herein.

To illustrate, FIG. 3 shows a media stream 300 that carries a media program. Media stream 300 includes media program content segments 302 (e.g., segments 302-1 through 302-4) that contain various segments of the media program. Media stream 300 further includes commercial breaks 304 (e.g., commercial breaks 304-1 through 304-3). Each commercial break 304 may include or may be otherwise associated with advertising content sponsored by one or more sponsors. Segments 302 and commercial breaks 304 are arranged in-line with one another along a time axis 306 such that, during a linear playback of the media program, segment 302-1 is configured to be played back first, followed sequentially by advertising content included in commercial break 304-1, and so on along media stream 300.

FIG. 3 further illustrates a clip 308 of the media program that is associated with a request to share clip 308 to social network 204. In this example, clip 308 is a single continuous segment of the media program having defined boundaries at different positions along time axis 306, although this is illustrative only.

Sponsor carryover facility 104 may be configured to identify a commercial break 304 included in media stream 300 in any suitable way. As an example, sponsor carryover facility 104 may be configured to analyze media stream 300, such as by analyzing analog and/or digital signaling associated with media stream 300 and/or content of such signaling to identify a commercial break. For instance, sponsor carryover facility 104 may analyze packet headers and/or commercial break cues (e.g., cue tones) included in media stream 300. As another example, sponsor carryover facility 104 may be configured to access a data structure (e.g., a database, a data table, etc.) and identify a commercial break 304 included in media stream 300 based on data included in the data structure. Such a data structure may be maintained by system 100 and/or as part of media distribution service 202.

In certain examples, the identifying of a commercial break 304 in media stream 300 may include sponsor carryover facility 104 selecting the commercial break 304 based on a temporal proximity, within the media program and/or media stream 300, of the commercial break 304 to the clip 308 of the media program. For example, sponsor carryover facility 104 may be configured to select the commercial break 304 in media stream 300 that is nearest, by temporal proximity, to the clip 308. In FIG. 3, for instance, of the commercial breaks 304 in media stream 300, commercial break 304-2 is nearest by temporal proximity to the clip 308. A temporal proximity 310 between the clip 308 and the commercial break 304-2 is illustrated in FIG. 3.

By selecting a commercial break 304 that is nearest, by temporal proximity, to the clip 308, sponsor carryover facility 104 factors the temporal position of the clip 308 within the media program and/or media stream 300 into the identifying of a sponsor of the media program to carry over to social network 204 in conjunction with the shared clip 308. In certain examples, sponsor carryover facility 104 may be configured to search only forward in time, only backward in time, or both forward and backward in time along time axis 306 to identify a commercial break 304 that is nearest, by temporal proximity, to the clip 308. In any other suitable way, the temporal position and/or one or more other attributes of the clip 308 may be factored into the identifying of a sponsor to carry over to social network 204 with the shared clip 308.

In certain examples, sponsor carryover facility 104 may be configured to identify one or more sponsors associated with the identified commercial break 304, such as sponsors of advertising content associated with the commercial break 304. The sponsors may be identified in any suitable way, including by analysis of the advertisement content included in the commercial break 304, analysis of media stream 300 (e.g., analysis of closed captioning information and/or any other information included in media stream 300), and/or analysis of data included in a data structure that specifies sponsor information for the media program and/or the commercial break 304.

In certain examples, sponsor carryover facility 104 may identify multiple sponsors associated with the media program and/or the identified commercial break 304 and select, from the multiple sponsors, a particular sponsor to carry over to social network 204 with the clip 308. Sponsor carryover facility 104 may be configured to select a particular sponsor to carry over to social network 204 based on a predefined sponsor selection heuristic, which may specify one or more conditions to be used to select a sponsor to carryover to social network 204 with clip 308. Examples of such conditions may include conditions related to temporal proximity of a sponsorship to the clip 308 in the media program, attributes of sponsors and/or sponsorships, content of sponsored advertisements, terms of agreements between a provider of system 100 and sponsors, terms of agreements between a provider of media distribution service 202 and sponsors, and/or any other conditions that may be used by sponsor carryover facility 104 to select a particular sponsor of a media program to carry over to social network 204 with the shared clip 308.

In certain examples, sponsor carryover facility 104 may be configured to select, in turn, a different one of multiple sponsors of a media program. For example, sponsor carryover facility 104 may be configured to use randomized selection logic (e.g., randomized selection logic that takes into account a time that a share request is received) to select a sponsor. As another example, sponsor carryover facility 104 may be configured to rotate through the sponsors of the media program, such as with a round-robin selection process.

While certain examples described herein relate to identifying a sponsor associated with a commercial break 304 in a media program, these examples are illustrative only. Sponsor carryover facility 104 may be configured to identify any sponsor of a media program in any suitable way and based on any suitable criteria. For example, sponsors may sponsor the media program in ways other than sponsoring placement of advertising content in commercial breaks 304. For instance, a sponsor may sponsor a presentation of a banner advertisement as an overlay presented during presentation of a segment of the media program in media distribution service 202. Another sponsor may sponsor a product placement within a scene of the media program. These and/or other sponsors of the media program may each or all be considered for carryover to social network 204 with a shared clip of the media program.

As mentioned, in certain examples, sponsor carryover facility 104 may identify a sponsor of a media program in media distribution service 202 to be carried over to social network 204 with a shared clip of the media program by analyzing media stream 300 that carries the media program in media distribution service 202 and determine, based on the analysis, the sponsor of the media program in media distribution service 202 to be carried over to social network 204. Additionally or alternatively, sponsor carryover facility 104 may identify a sponsor of a media program in media distribution service 202 to be carried over to social network 204 with a shared clip of the media program by accessing a data structure and determining, based on data included in the data structure, the sponsor of the media program in media distribution service 202 to be carried over to social network 204.

The data structure may include data representative of information about the media program, including data indicating one or more sponsors of the media program. In certain examples, the data structure may indicate a sponsor as a pre-designated carryover sponsor for the media program, such as a pre-designated carryover sponsor for a particular social media service.

The data structure may include any suitable type of data structure, such as a data table, a database, etc. The data structure may be generated and/or maintained in any suitable way by system 100, as part of media distribution service 202, and/or by a provider of system 100 or media distribution service 202.

Figure 4:
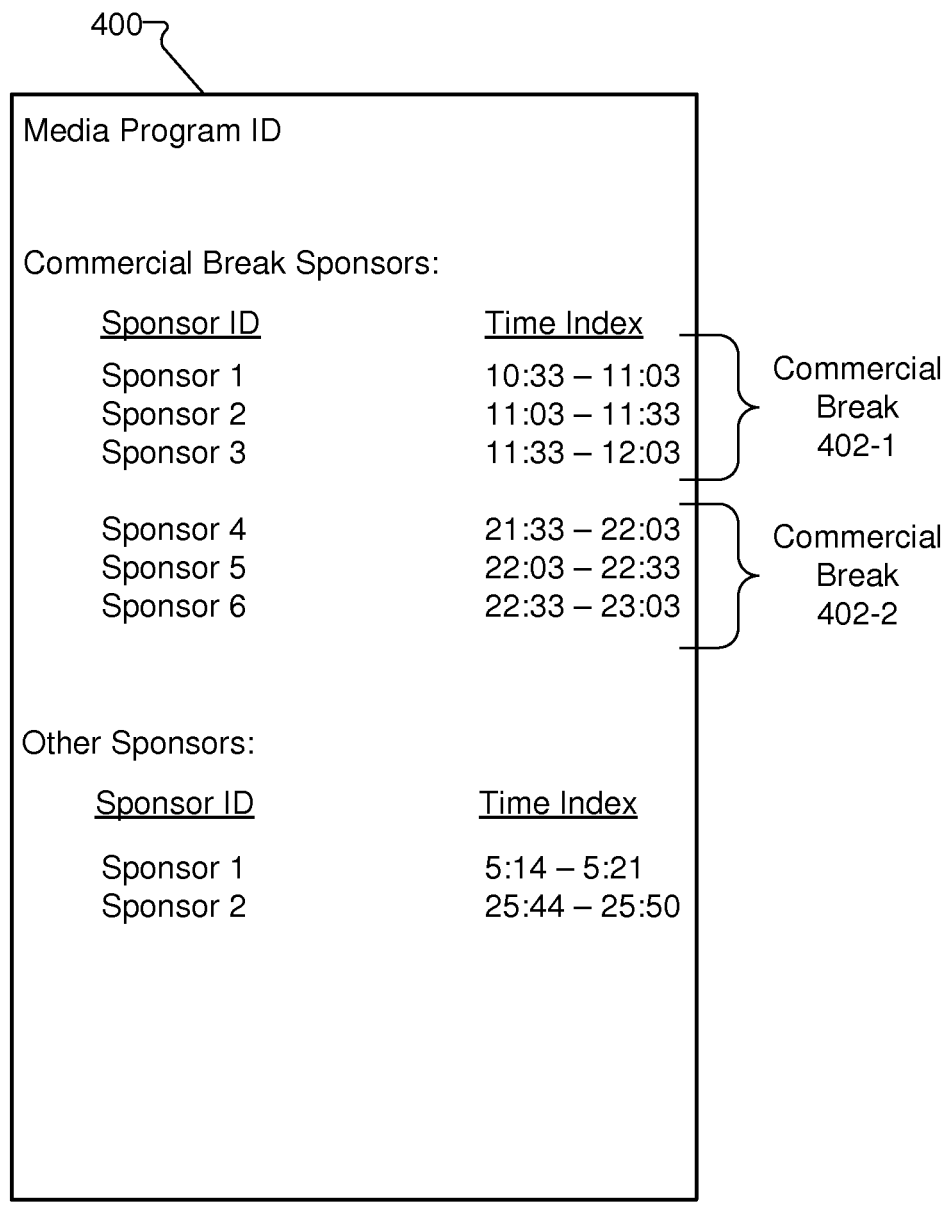

FIG. 4 illustrates an exemplary data table 400 that is specific to a particular media program having a "Media Program ID." As shown, data table 400 may include information specifying sponsors of the media program. In the illustrated example, data table 400 includes information about sponsors of advertising content in commercial breaks ("commercial break sponsors") and other types of sponsors ("other sponsors").

Within a section of information about commercial break sponsors, sponsor identifiers ("IDs") for six sponsors are depicted along with time index information for each sponsor. The time index information may indicate playback times within a playback of the media program that advertisements sponsored by the commercial break sponsors are scheduled to be played back. Advertisements sponsored by the first three commercial break sponsors are scheduled for playback within a first commercial break 402-1, and advertisements sponsored by the next three commercial break sponsors are scheduled for playback within a second commercial break 402-2.

Within a section of information about other sponsors, sponsor IDs for two other sponsors are depicted along with time index information for each sponsor. The time index information may indicate playback times associated with sponsored content (e.g., presentation of a banner advertisement, a product placement in a scene of the media program, etc.).

FIG. 5 illustrates an exemplary data table 500 that includes data specifying media programs distributed by media distribution service 202 and one or more sponsors of each of the media programs. For example, data table 500 indicates a media program ID for each media program and a sponsor ID for each sponsor. For instance, data table 500 indicates that a sponsor identified as "Sponsor 1" sponsors a media program identified as "Media Program 1."

Sponsor carryover facility 104 may be configured to access either or both data table 400 and data table 500 and determine, based on data included in either or both data table 400 and data table 500, a sponsor to be carried over to social network 204 with a shared clip of a media program, such as described herein.

Sponsor carryover facility 104 may be configured to identify a sponsor of a media program in media distribution service 202 to be carried over to social network 204 with a shared clip of the media program in any of the exemplary ways described herein. However, the examples described herein are illustrative only. Sponsor carryover facility 104 may identify a sponsor of a media program in media distribution service 202 to be carried over to social network 204 with a shared clip of the media program in any suitable way. The identifying of the sponsor may include sponsor carryover facility 104 using data generated and/or maintained by system 100 and/or communicating with media distribution service 202 to access data generated and/or maintained by media distribution service 202. Such data may include a media stream, a data structure, and/or any other data that may be used by sponsor carryover facility 104 to identify a sponsor of a media program in media distribution service 202 to be carried over to social network 204 with a shared clip of the media program.

As mentioned, sponsor carryover operations may include sponsor carryover facility 104 sharing data representative of an identified sponsor of the media program in media distribution service 202 to social network 204 in response to a request to share a clip of the media program to social network 204.

The sharing may be performed in any suitable way. For example, sponsor carryover facility 104 may transmit data representative of the sponsor to computing devices associated with social network 204. The data representative of the sponsor may be transmitted to computing devices associated with social network 204 together with or separate from data representative of the clip transmitted to computing devices associated with social network 204 by clip sharing facility 102.

The data representative of the sponsor may include any data configured for use by computing devices associated with social network 204 to present information about the sponsor to social network 204. For example, the data representative of the sponsor may include data representative of a sponsor image (e.g., a logo), advertisement, text, and/or any other information configured to be presented to convey to social network 204 that the shared clip of the media program and/or the media program is sponsored by the sponsor.

Figure 6:
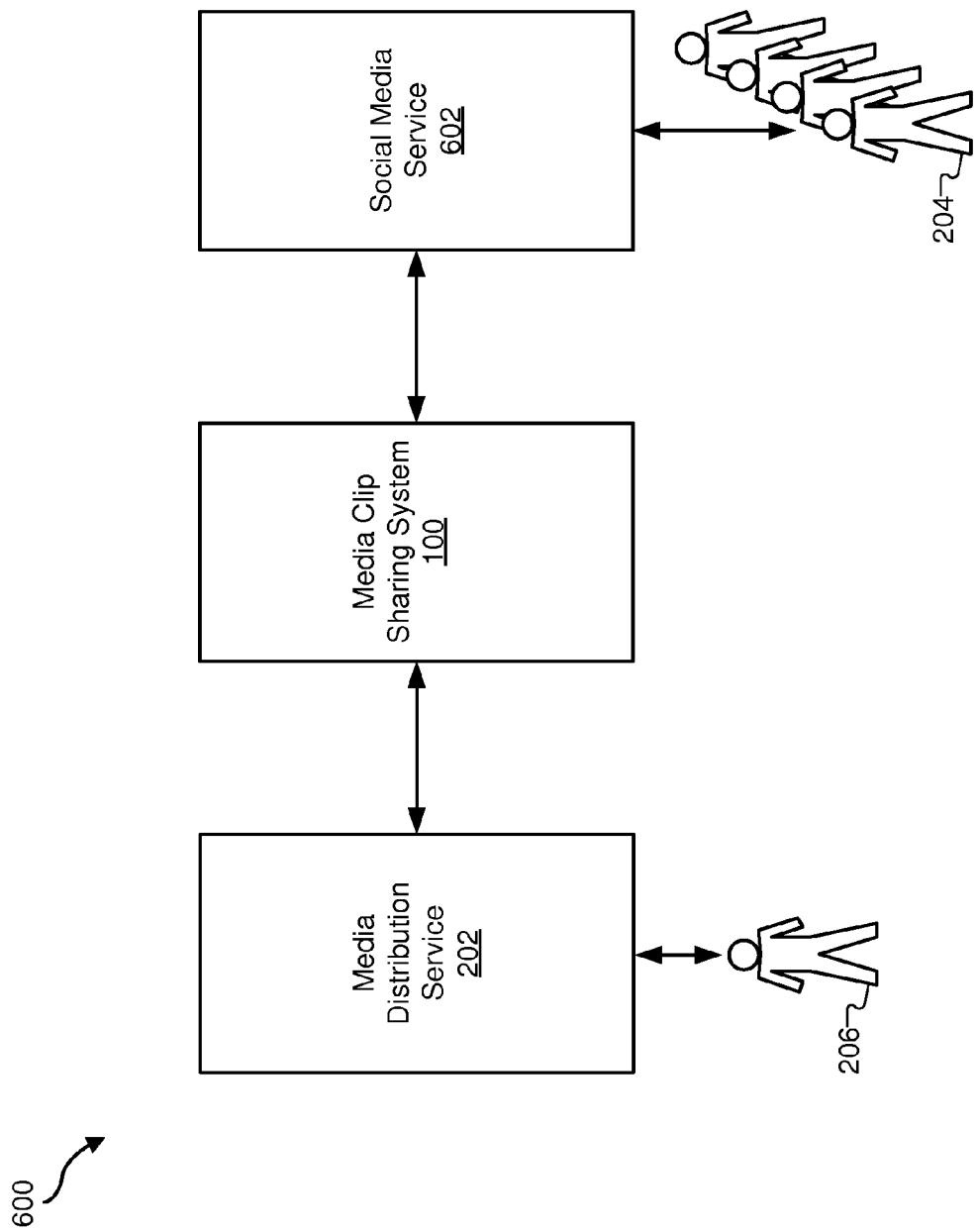
FIG. 6 illustrates an exemplary configuration in which the system of FIG. 1 is in communication with a media distribution service and a social media service according to principles described herein.

In certain examples, system 100 may be configured to share a clip of a media program and data representative of a sponsor of the media program to social network 204 by sharing the clip of the media program and the data representative of the sponsor of the media program to a social media service configured to distribute social media to social network 204. To illustrate, FIG. 6 shows an exemplary configuration 600 in which system 100 is in communication with media distribution service 202 and a social media service 602. System 100 may be in communication with media distribution service 202 and social media service 602 by way of any suitable communication technologies, including any of those mentioned herein.

Social media service 602 may include any service configured to facilitate distribution of social media to one or more end-users of social media service 602. Social media service 602 may be associated with (e.g., operated by) a provider of social media service 602 (a "social media service provider"). Through social media service 602, an end-user of social media service 602, such as a member of social network 204, may post and/or access social media content.

Social media service 602 may include and/or be provided by an appropriately configured social media service system, which may include any system of computing devices and/or other equipment configured to receive and distribute social media to end-users of social media service 602. Social media service 602 may include any type of social media service configured to distribute any format of social media by way of any suitable social media distribution medium. In certain examples, for instance, social media service 602 may include a service provided by a social networking site (e.g., a social networking website), a weblog, a social media blog, a social media micro-blog, an Internet forum, a wiki, a social broadcasting service, and/or any other type of social media service. Examples of social media services include, without limitation, social media services provided by FACEBOOK, TWITTER, FOURSQUARE, PINTEREST, and YOUTUBE.

Social media service 602 may receive a shared clip of a media program and data representative of a sponsor of the media program from system 100. The shared clip of the media program and the data representative of the sponsor of the media program may be configured to be distributed by social media service 602 to social network 204. Social media service 602 may perform one or more operations to distribute the shared clip and the data representative of the sponsor of the media program to social network 204 in any manner configured to convey to social network 204 that the shared clip of the media program and/or the media program is sponsored by the sponsor of the media program.

The exemplary systems and methods described herein may be configured to provide one or more GUIs related to media clip sharing with sponsor carryover. FIGS. 7-11 illustrate exemplary media clip sharing GUI views, which will now be described.

Figure 7:
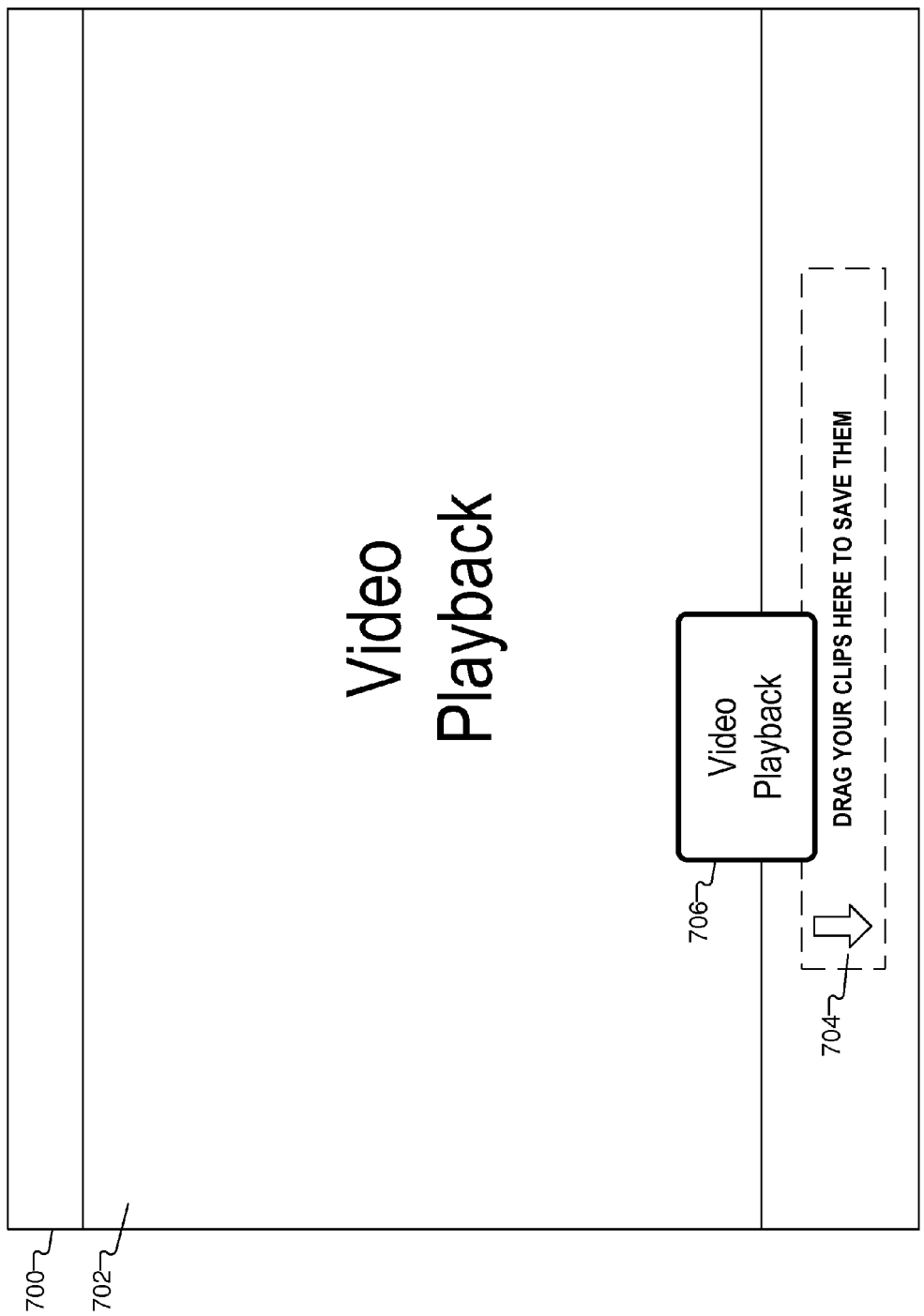
FIGS. 7-11 illustrate exemplary media clip sharing graphical user interface views according to principles described herein.

FIG. 7 illustrates an exemplary media clip sharing GUI view 700 in which video is played back in a video playback area 702. A clip drop area 704 may be displayed together with active video playback such that a user may provide input to drag a representation of the video playback from the video playback area 702 to the clip drop area 704 to initiate a creation of a clip of the video being played back. FIG. 7 illustrates a visual representation 706 of the video playback as it is dragged by a user from the video playback area 702 to the clip drop area 704 to initiate a creation of a clip of the video being played back.

In response to the representation 706 of the video playback being dropped in the clip drop area 704, a clip of the video being played back may be created. For example, a recording of the video being played back may start at a time that coincides with the dropping of the representation 706 of the video playback in the clip drop area 704.

Figure 8:
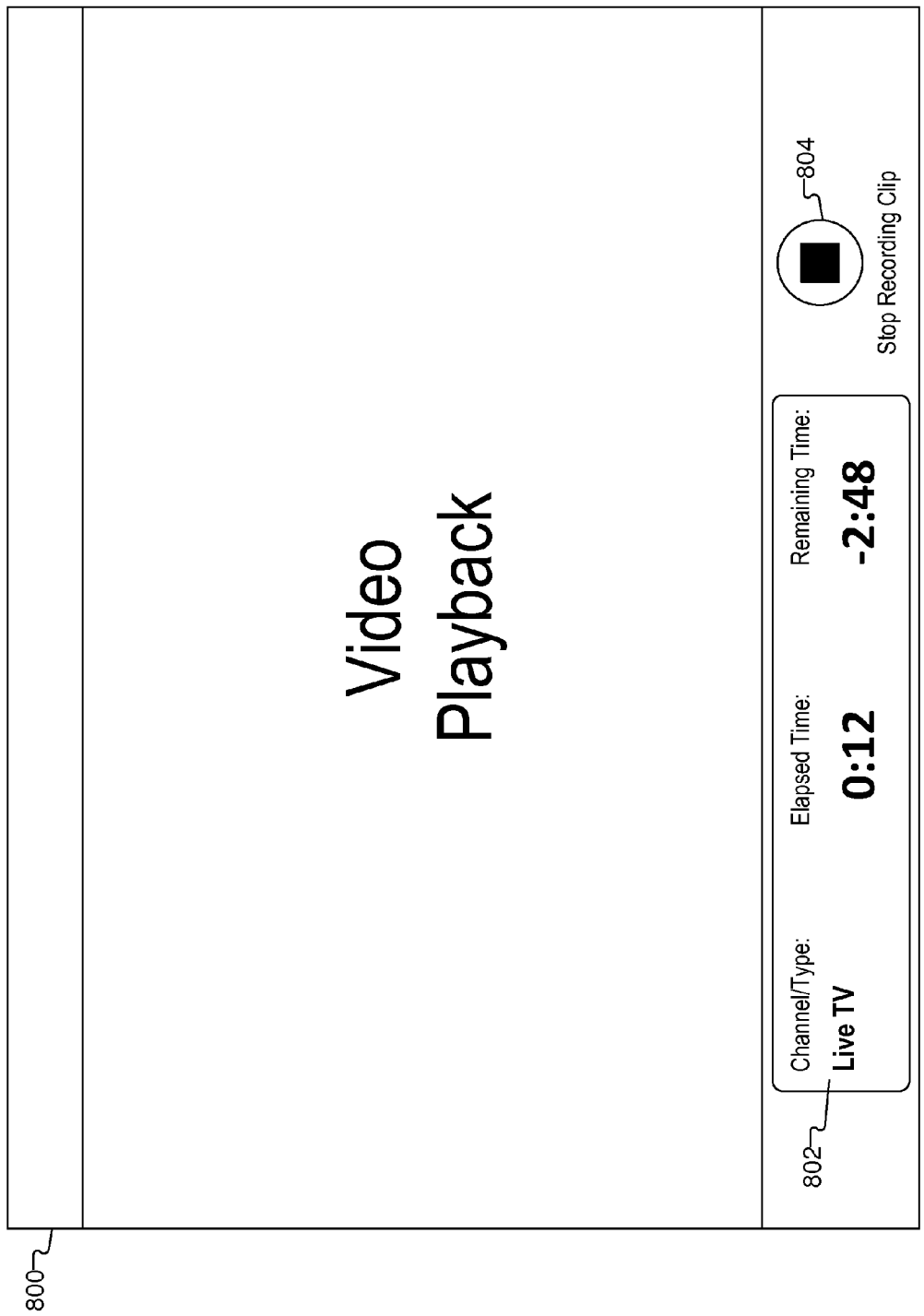

FIG. 8 illustrates an exemplary media clip sharing GUI view 800 that may be displayed while a clip of the video being played back is being recorded. As shown, GUI view 800 may include a clip information area 802 that contains information about the clip being recorded. For example, the information may indicate a type of media program that is being recorded (e.g., a "Live TV" type of media program), the current elapsed time of the recording, and the remaining time that may be recorded until a predefined maximum clip duration will be reached or until the end of the media program. GUI view 800 may also include an option 804 configured to be selected by a user to stop the recording of the clip of the video being played back.

Figure 9:
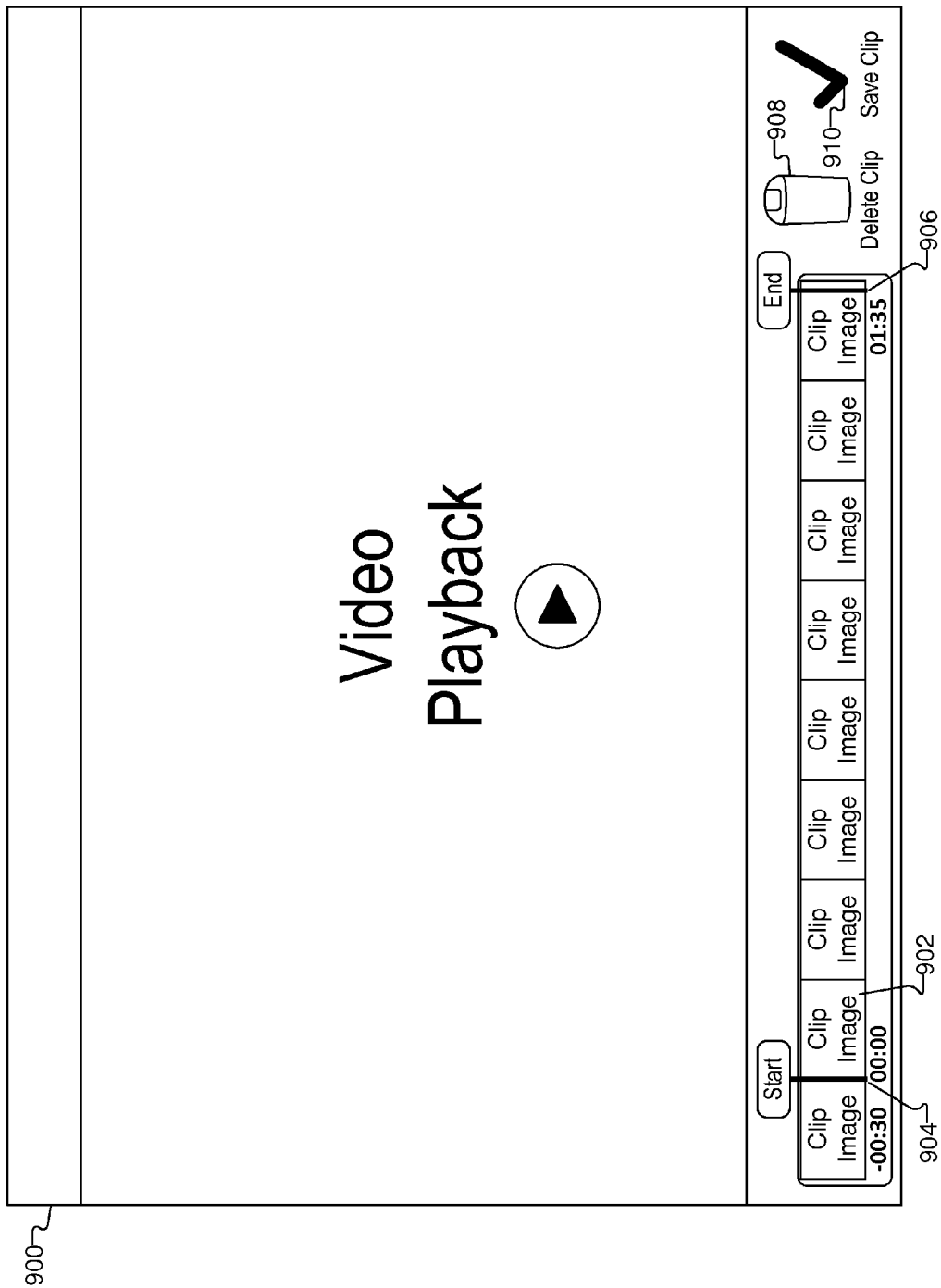

FIG. 9 illustrates an exemplary media clip sharing GUI view 900 that may be displayed after a video clip has been defined, such as after a user selection of option 804 shown in FIG. 8 to stop the recording of the clip. As shown, GUI view 900 may include content associated with the defined video clip. For example, GUI view 900 may include one or more clip images (e.g., video frames) that are included in the video clip, with the clip images displayed linearly in sequential order of playback. In the illustrated example, clip image 902 represents the first sequential frame included in the defined clip. GUI view 900 may also include an indication 904 of a start (e.g., a start time) of the video clip and an indication 906 of a stop (e.g., a stop time) of the video clip. GUI view 900 may further include an option 908 configured to be selected by a user to delete the video clip and an option 910 configured to be selected by a user to save the video clip.

In the above-described or a similar manner, a user may create one or more clips of media programs that may be stored to memory and associated with the user. The user may be provided with one or more tools for use by the user to access, share, and/or otherwise manage clips defined by the user.

Figure 10:
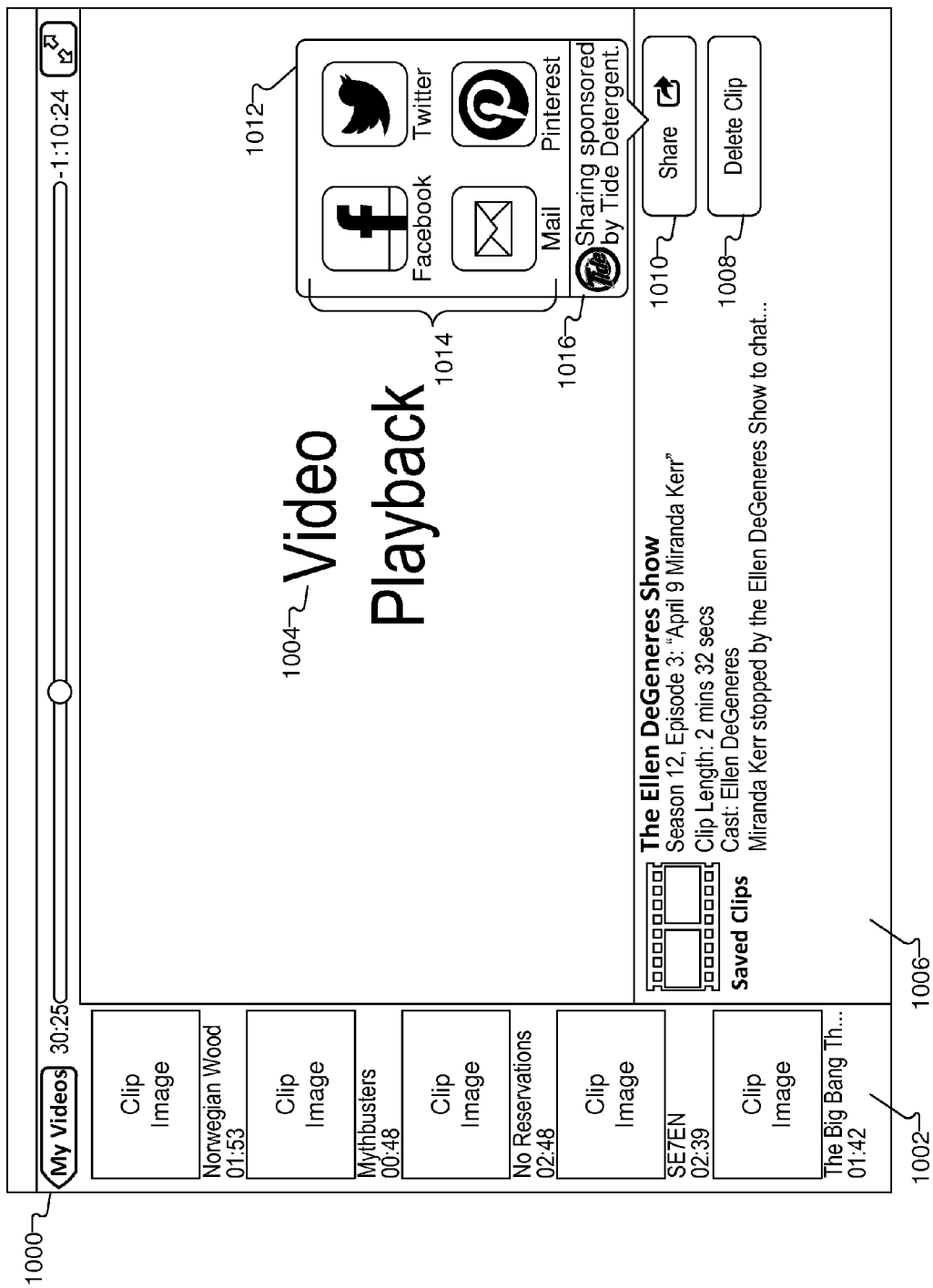

For example, FIG. 10 illustrates an exemplary media clip sharing GUI view 1000 that may be displayed and that may include one or more tools for use by a user to access, share, and/or otherwise manage clips defined by the user. As shown, GUI view 1000 may include a clip menu area 1002 that includes a menu of clips defined by the user and a video playback area 1004 in which a selected clip may be played back. GUI view 1000 may further include a clip information area 1006 in which information about a selected clip may be displayed.

GUI view 1000 may include an option 1008 configured to be selected by the user to delete a selected clip and a share option 1010 configured to be selected by the user to initiate a sharing of a selected clip. The sharing of the selected clip may be performed in response to the user selection of option 1010 and may include sharing the selected clip to a social network in any of the ways described herein.

In certain examples, in response to the user selection of share option 1010, one or more additional share options may be presented to the user. For example, GUI view 1000 includes a pop-up window 1012 displayed in response to a user selection of share option 1010. As shown, pop-up window 1012 may include additional share options for sharing the selected clip. In the illustrated example, pop-up window 1012 includes a set of additional share options 1014 each configured to be selected by the user to select how a user would like to share the selected clip. As shown, the additional options 1014 may include one or more options each associated with a particular social network and/or social media service to which the user may share the selected clip. For instance, in the illustrated example, the user may select to share the selected clip to a social media service known as FACEBOOK, TWITTER, or PINTEREST.

GUI view 1000 may include an indication 1016 that the sharing of the selected clip is sponsored by a particular sponsor of the media program that includes the clip being shared. In the illustrated example, the indication 1016 visually indicates that the sharing of the clip is sponsored by a sponsor known as "TIDE Detergent." In FIG. 10, indication 1016 includes a logo and text indicating the sponsor of the sharing of the clip.

In response to a user selection of an option to share the clip, such as a user selection of an option to share the clip to a particular social media service, a request to share the clip may be created. System 100 may receive the share request in any suitable way and respond by performing one or more of the operations described herein to share the clip of the media program and data representative of a sponsor of the clip and/or the media program to a social network.

Figure 11:
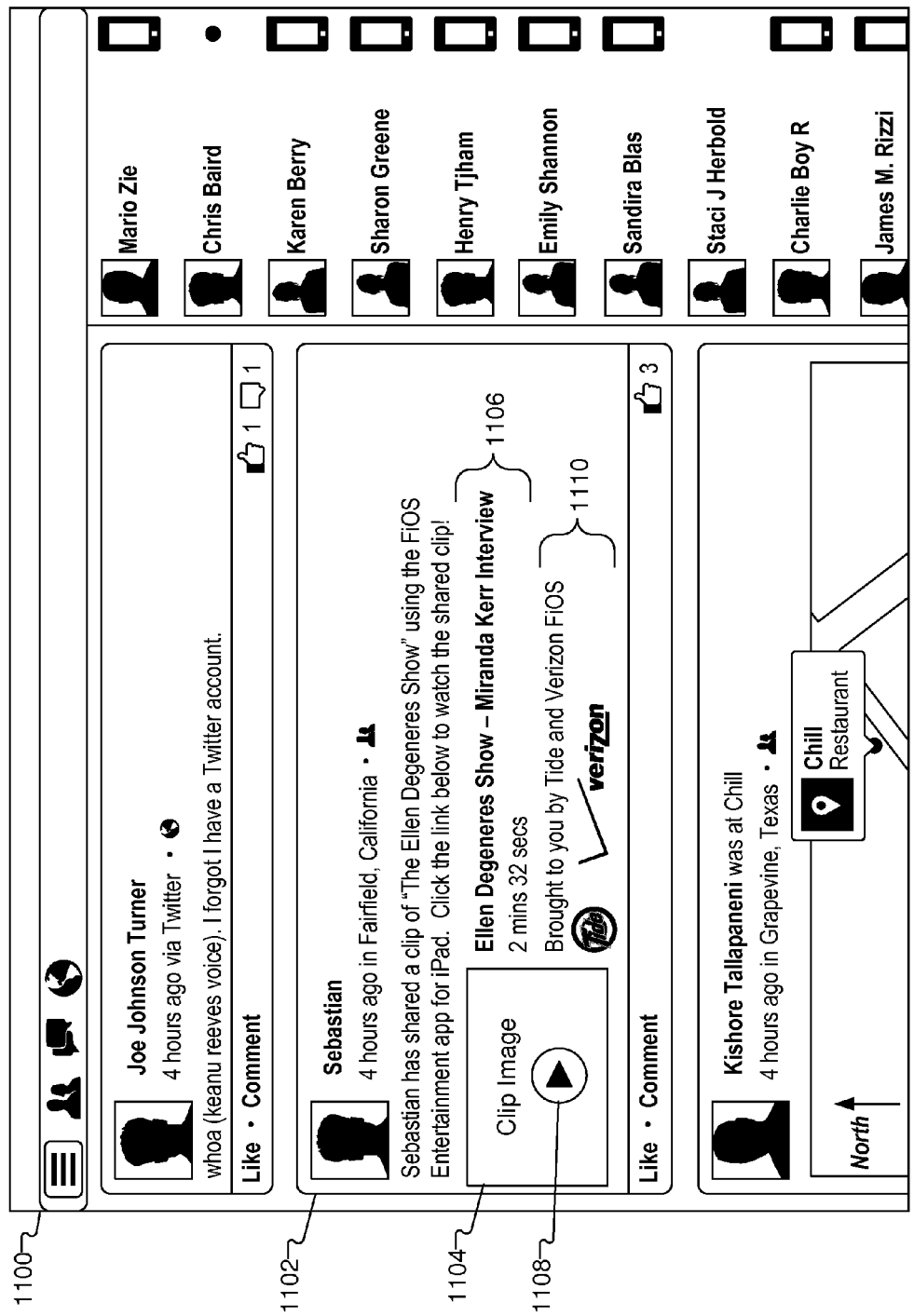

FIG. 11 illustrates an exemplary media clip sharing GUI view 1100 that may be presented to a member of a social network to which the clip is shared. As shown, GUI view 1100 may include a social media post 1102 associated with the shared clip. As shown, social media post 1102 may indicate that a user has shared the clip, as well as information indicating when, how, and/or from what source the user shared the clip. Social media post 1102 may include a thumbnail image 1104 representative of the shared clip, information 1106 about the shared clip, and an option 1108 configured to be selected by a user to initiate playback of the shared clip.

As further shown, social media post 1102 may include sponsor content 1110 representative of a sponsor of the shared clip that has been carried over from the source of the clip to social media post 1102. In FIG. 11, sponsor content 1110 includes text and a logo indicating that the shared clip is sponsored by a sponsor known as "TIDE." In FIG. 11, sponsor content 1110 further indicates an additional sponsor of the shared clip, which sponsor may be a provider of system 100 and/or media distribution service 202. In the illustrated example, the additional sponsor is known as "VERIZON."

The exemplary GUI views illustrated in FIGS. 7-11 are illustrative only. Additional or alternative GUI views may be presented in other examples.

Figure 12:
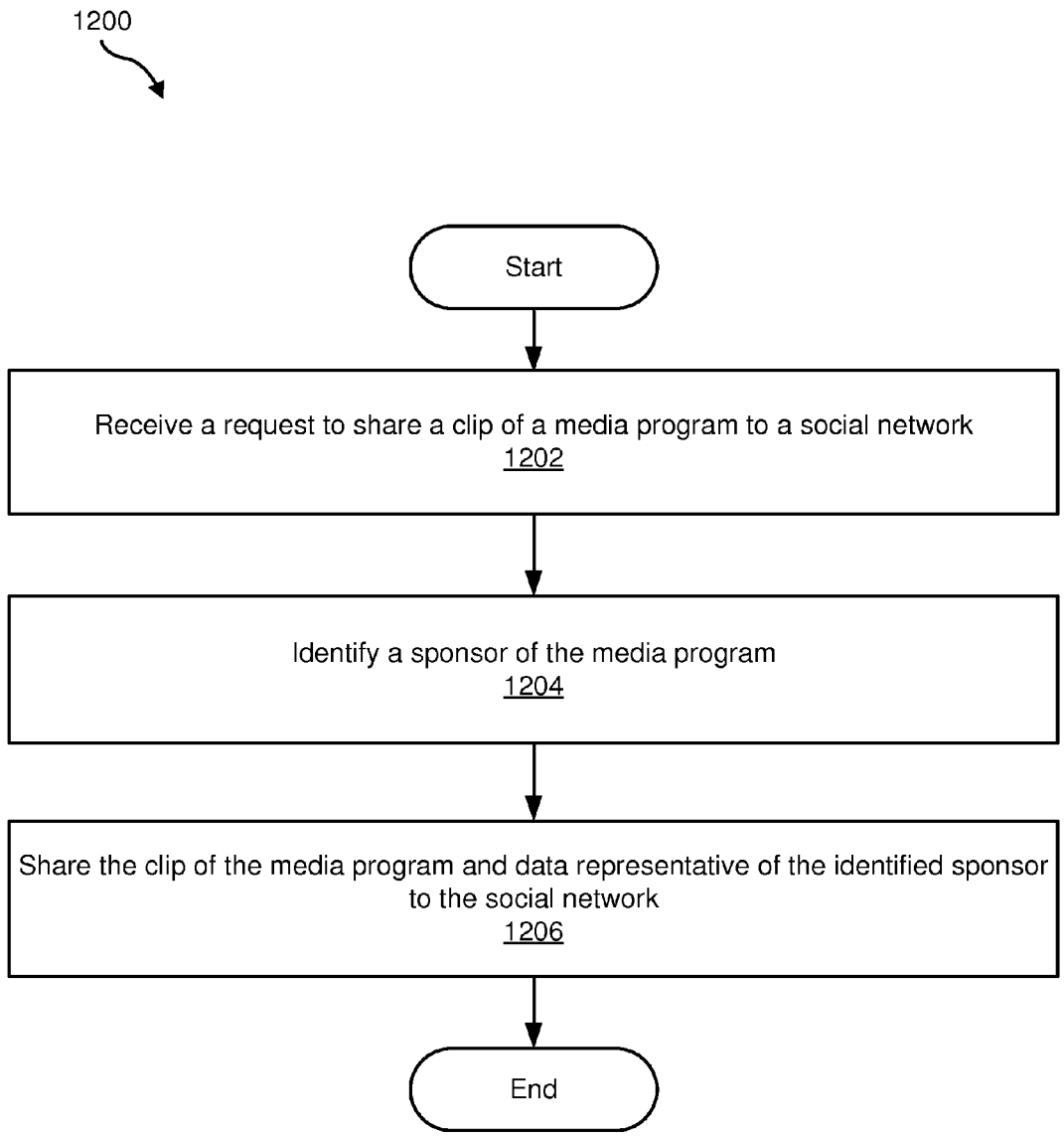
FIGS. 12-13 illustrate exemplary methods according to principles described herein.

FIG. 12 illustrates an exemplary method 1200 of media clip sharing with sponsor carryover. While FIG. 12 illustrates exemplary steps according to one embodiment, other embodiments may omit, add to, reorder, combine, and/or modify any of the steps shown in FIG. 12. One or more of the steps shown in FIG. 12 may be performed by system 100 and/or any elements and/or implementation thereof.

In step 1202, system 100 receives a request to share a clip of a media program to a social network. Step 1202 may be performed in any of the ways described herein, including by system 100 receiving the request from an end-user of media distribution service 202 that distributes the media program. In certain examples, the request to share the clip of the media program to the social network may include a request to share the clip of the media program to a social media service that is configured to distribute social media to the social network.

In step 1204, system 100 identifies a sponsor of the media program. Step 1204 may be performed in any of the ways described herein and may be performed in response to the receiving of the share request in step 1202.

In step 1206, system 100 shares the clip of the media program and data representative of the identified sponsor to the social network. Step 1206 may be performed in any of the ways described herein and may be performed in response to the receiving of the share request in step 1202. In certain examples, the sharing of the clip of the media program and data representative of the identified sponsor to the social network may include sharing the clip of the media program and data representative of the identified sponsor to a social media service configured to distribute social media to the social network. The sharing of the clip of the media program and data representative of the identified sponsor to a social media service may be configured to cause the social media service to distribute a social media post associated with the clip of the media program to the social network.

Figure 13:
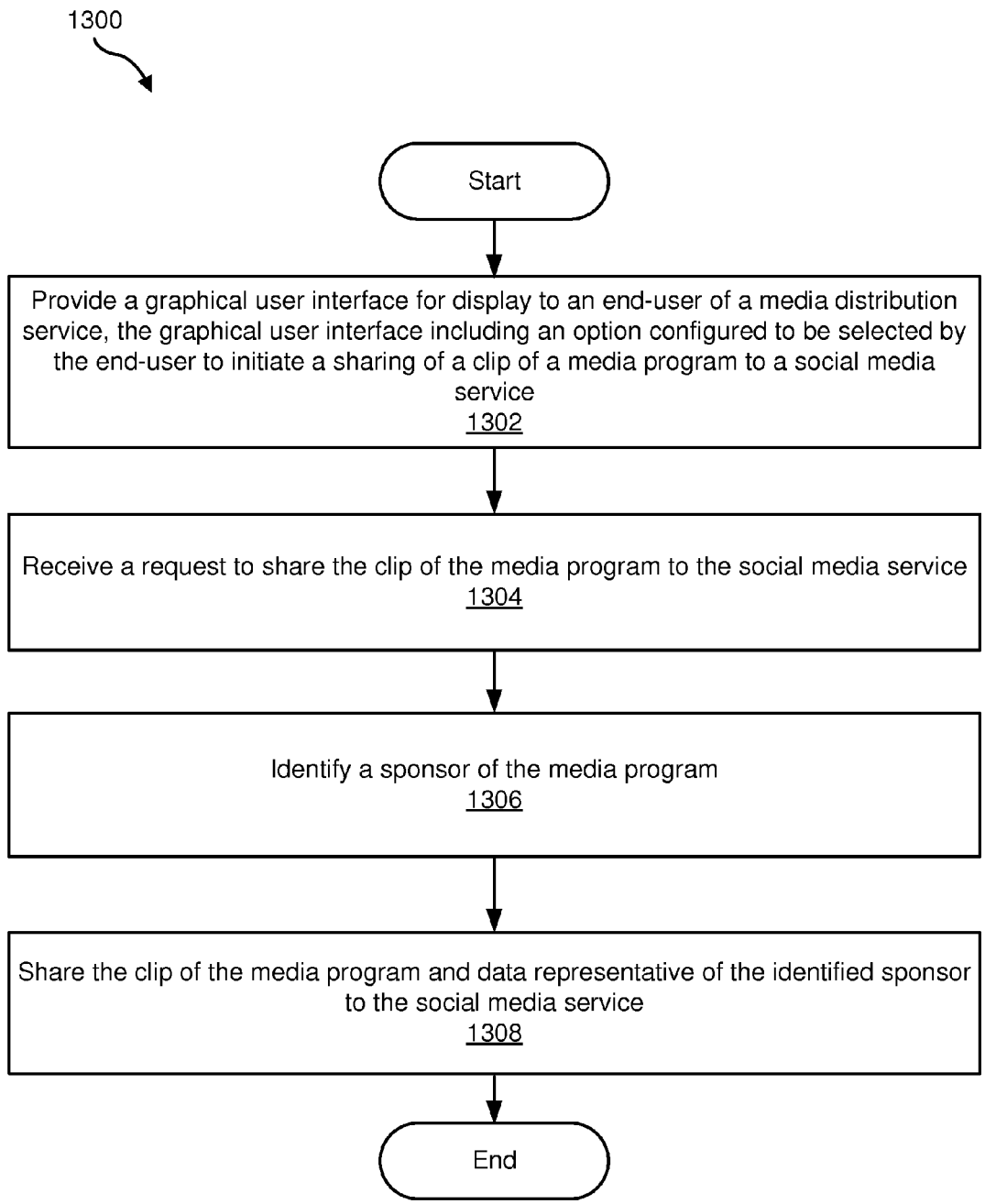

FIG. 13 illustrates an exemplary method 1300 of media clip sharing with sponsor carryover. While FIG. 13 illustrates exemplary steps according to one embodiment, other embodiments may omit, add to, reorder, combine, and/or modify any of the steps shown in FIG. 13. One or more of the steps shown in FIG. 13 may be performed by system 100 and/or any elements and/or implementation thereof.

In step 1302, system 100 provides a GUI for display to an end-user of a media distribution service, the GUI including an option configured to be selected by the end-user to initiate a sharing of a clip of a media program to a social media service. The GUI may include any of the exemplary GUI views described herein, such as GUI view 1000 shown in FIG. 10.

In step 1304, system 100 receives a request to share the clip of the media program to the social media service. Step 1304 may be performed in any of the ways described herein. In certain examples, the request is received in response to the end-user selecting the option included in the GUI provided in step 1302.

In step 1306, system 100 identifies a sponsor of the media program. Step 1306 may be performed in any of the ways described herein and may be performed in response to the receiving of the share request in step 1304.

In step 1308, system 100 shares the clip of the media program and data representative of the identified sponsor to the social media service. Step 1308 may be performed in any of the ways described herein and may be performed in response to the receiving of the share request in step 1304. The sharing of the clip of the media program and the data representative of the identified sponsor to the social media service may be configured to cause the social media service to distribute a social media post associated with the shared clip of the media program to a social network. The social media post may include sponsor content representative of the sponsor of the media program displayed together with information about the clip of the media program, an example of which is illustrated in GUI view 1100 shown in FIG. 11.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a Compact Disc Read-Only Memory ("CD-ROM"), a Digital Versatile Disc ("DVD"), any other optical medium, a Random-Access Memory ("RAM"), a Programmable ROM ("PROM"), an Erasable PROM ("EPROM"), a Flash Electrically EPROM ("FLASH-EEPROM"), any other memory chip or cartridge, or any other tangible medium from which a computer can read.

Figure 14:
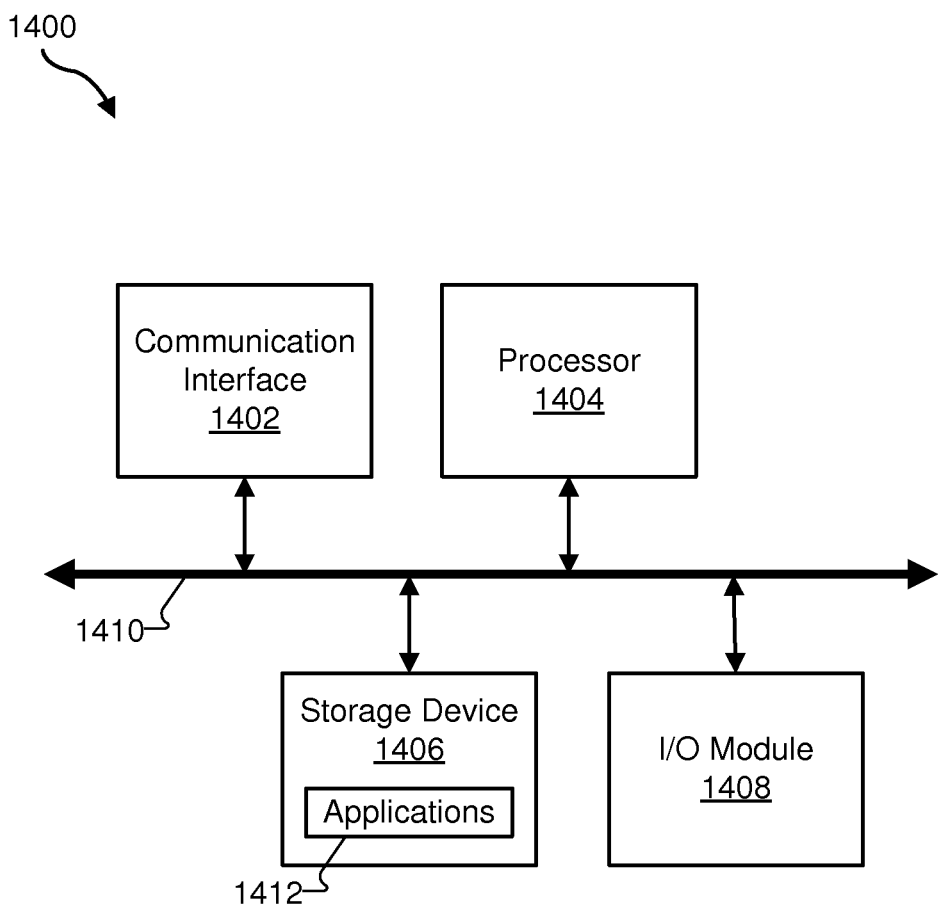
FIG. 14 illustrates an exemplary computing device according to principles described herein.

FIG. 14 illustrates an exemplary computing device 1400 that may be configured to perform one or more of the processes described herein. As shown in FIG. 14, computing device 1400 may include a communication interface 1402, a processor 1404, a storage device 1406, and an input/output ("I/O") module 1408 communicatively connected via a communication infrastructure 1410. While an exemplary computing device 1400 is shown in FIG. 14, the components illustrated in FIG. 14 are not intended to be limiting. Additional, fewer, or alternative components may be used in other embodiments. Components of computing device 1400 shown in FIG. 14 will now be described in additional detail.

Communication interface 1402 may be configured to communicate with one or more computing devices. Examples of communication interface 1402 include, without limitation, a wired network interface (such as a network interface card), a wireless network interface (such as a wireless network interface card), a modem, an audio/video connection, and any other suitable interface.

Processor 1404 generally represents any type or form of processing unit capable of processing data or interpreting, executing, and/or directing execution of one or more of the instructions, processes, and/or operations described herein. Processor 1404 may execute and/or direct execution of operations as directed by one or more applications 1412 or other computer-executable instructions such as may be stored in storage device 1406 or another computer-readable medium.

Storage device 1406 may include one or more data storage media, devices, or configurations and may employ any type, form, and combination of data storage media and/or device. For example, storage device 1406 may include, but is not limited to, a hard drive, network drive, flash drive, magnetic disc, optical disc, RAM, DRAM, other non-volatile and/or volatile data storage units, or a combination or sub-combination thereof. Electronic data, including data described herein, may be temporarily and/or permanently stored in storage device 1406. For example, data representative of one or more applications 1412 configured to direct processor 1404 to perform any of the operations described herein may be stored within storage device 1406. In some examples, data may be arranged in one or more databases residing within storage device 1406.

I/O module 1408 may be configured to receive user input and provide user output and may include any hardware, firmware, software, or combination thereof supportive of input and output capabilities. For example, I/O module 1408 may include hardware and/or software for capturing user input, including, but not limited to, a keyboard or keypad, a touch screen component (e.g., touch screen display), a receiver (e.g., a radio frequency ("RF") or infrared receiver), and/or one or more input buttons.

I/O module 1408 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1408 is configured to provide graphical data to a display for presentation to a user. The graphical data may be representative of one or more GUI views and/or any other graphical content as may serve a particular implementation.

In some examples, any of the facilities described herein may be implemented by or within one or more components of computing device 1400. For example, one or more applications 1412 residing within storage device 1406 may be configured to direct processor 1404 to perform one or more processes or functions associated with clip sharing facility 102 and/or sponsor carryover facility 104. Likewise, storage facility 106 may be implemented by or within storage device 1406. Such an implementation may be referred to as a computer-implemented system, such as a computer-implemented media clip sharing system 100.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
    receiving, by a computer-implemented media clip sharing system from an end-user of a media distribution service that distributes a media program, a request to share a clip of the media program to a social network; and
    in response to the request to share the clip of the media program to the social network,
        identifying, by the computer-implemented media clip sharing system, a sponsor of the media program in the media distribution service, and
        sharing, by the computer-implemented media clip sharing system, the clip of the media program and data representative of the identified sponsor to the social network.

2. The method of claim 1, wherein the clip of the media program is defined by the end-user of the media distribution service.

3. The method of claim 1, wherein the identifying of the sponsor of the media program comprises:
    identifying a commercial break in the media program; and
    identifying a sponsor of advertising content associated with the commercial break.

4. The method of claim 3, wherein the identifying of the commercial break comprises selecting the commercial break based on a temporal proximity, within the media program, of the commercial break to the clip of the media program.

5. The method of claim 1, wherein the identifying of the sponsor comprises selecting the sponsor from a plurality of sponsors of the media program in the media distribution service in accordance with a sponsor selection heuristic.

6. The method of claim 1, wherein the identifying of the sponsor comprises:
    analyzing a media stream that carries the media program in the media distribution service; and
    determining, based on the analyzing of the media stream, the sponsor of the media program in the media distribution service.

7. The method of claim 1, wherein the identifying of the sponsor comprises:
    accessing a data structure; and
    determining, based on data included in the data structure, that the sponsor is designated in the media distribution service to be shared to the social network together with the clip of the media program.

8. The method of claim 1, wherein:
    the media distribution service comprises a television programming distribution service configured to distribute television programming in accordance with a linear television programming schedule; and
    the clip of the media program comprises a clip of a television program included in the television programming.

9. The method of claim 8, wherein the sponsor of the media program in the media distribution service comprises a sponsor of an advertisement configured for presentation in a commercial break in the television program.

10. The method of claim 1, wherein the sharing of the clip of the media program and the data representative of the identified sponsor to the social network comprises sharing the clip of the media program and the data representative of the identified sponsor to a social media service for distribution to the social network by the social media service.

11. The method of claim 10, further comprising providing, by the computer-implemented media clip sharing system, a graphical user interface for display to the end-user of the media distribution service, the graphical user interface including an option configured to be selected by the end-user to create the request to share the clip of the media program to the social media service.

12. The method of claim 10, wherein the sharing of the clip of the media program and the data representative of the identified sponsor to the social media service is configured to cause the social media service to distribute a social media post associated with the clip of the media program to the social network.

13. The method of claim 1, embodied as computer-executable instructions on at least one non-transitory computer-readable medium.

14. A method comprising:
providing, by a computer-implemented media clip sharing system, a graphical user interface for display to an end-user of a media distribution service, the graphical user interface including an option configured to be selected by the end-user to share a clip of a media program to a social media service;
receiving, by the computer-implemented media clip sharing system in response to the end-user selecting the option to share the clip of the media program to the social media service, a request to share the clip of the media program to the social media service;
identifying, by the computer-implemented media clip sharing system, a sponsor of the media program in the media distribution service; and
sharing, by the computer-implemented media clip sharing system, the clip of the media program and data representative of the identified sponsor to the social media service.

15. The method of claim 14, wherein the graphical user interface further includes a visual indication of the sponsor of the media program displayed together with the option configured to be selected by the end-user to share the clip of the media program to the social media service.

16. The method of claim 14, wherein the graphical user interface further includes an additional option configured to be selected by the end-user to share the clip of the media program to an additional social media service, the additional option displayed together with the option configured to be selected by the end-user to share the clip of the media program to the social media service.

17. The method of claim 14, wherein the sharing of the clip of the media program and the data representative of the identified sponsor to the social media service is configured to cause the social media service to distribute a social media post associated with the clip of the media program to a social network.

18. The method of claim 17, wherein the social media post includes sponsor content representative of the sponsor of the media program displayed together with information about the clip of the media program.

19. The method of claim 14, embodied as computer-executable instructions on at least one non-transitory computer-readable medium.

20. A system comprising:
at least one physical computing device; and
a clip sharing facility configured to direct the at least one physical computing device to receive a request to share a clip of a media program to a social network, the request provided by an end-user of a media distribution service that distributes the media program; and
a sponsor carryover facility configured to direct, in response to the request to share the clip of the media program to the social network, the at least one physical computing device to
identify a sponsor of the media program in the media distribution service, and
share the clip of the media program and data representative of the identified sponsor to the social network.

21. The method of claim 1, wherein the clip of the media program does not include an indication of the sponsor of the media program.

22. The method of claim 21, wherein the data representative of the identified sponsor is configured for use by a computing device associated with social network to present, by the computing device, information about the sponsor.

* * * * *